Feb. 25, 1964  I. L. PHILLIPS ETAL  3,121,973
SOIL TREATING METHOD

Filed Jan. 5, 1962  2 Sheets-Sheet 1

INVENTORS
Irvine L. Phillips
BY Jack C. Bolton
Robert P. Watwood

Townsend and Townsend
attorneys

Feb. 25, 1964   I. L. PHILLIPS ETAL   3,121,973
SOIL TREATING METHOD
Filed Jan. 5, 1962   2 Sheets-Sheet 2
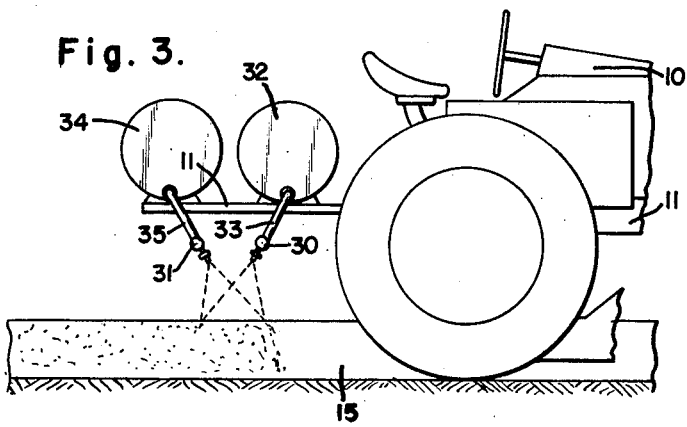
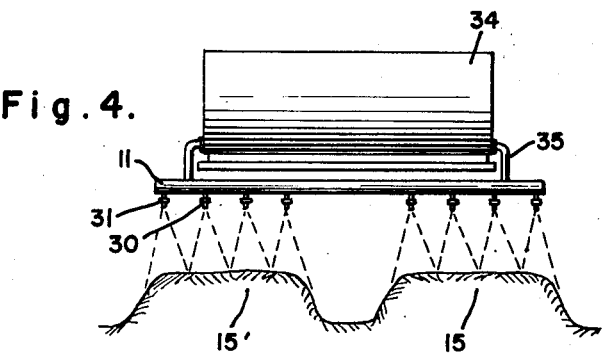
INVENTORS
Irvine L. Phillips
Jack C. Bolton
Robert P. Watwood
BY
Townsend and Townsend
attorneys

United States Patent Office 3,121,973
Patented Feb. 25, 1964

3,121,973
SOIL TREATING METHOD
Irvine L. Phillips, Kings City, and Jack C. Bolton and Robert P. Watwood, Salinas, Calif., assignors to Soilserv Incorporated, Salinas, Calif.
Filed Jan. 5, 1962, Ser. No. 164,556
10 Claims. (Cl. 47—9)

This invention relates to a method and system for concurrently chemically treating agricultural soil and shaping seed beds therefrom while leaving the beds in a condition which tends to prevent escape of the treatment chemicals, as by volatilization which have been placed in the ground.

The gist of the invention is to relatively rapidly and sequentially manipulate a piece of ground by injecting chemicals horizontally substantially without disturbing the soil surface, preparing the soil surface in the treated area so that seed beds may be and are shaped therefrom, and finally capping the operation by sealing the surface of the seed beds to prevent loss of the injected chemicals.

Horizontal placement of the chemicals without substantially disrupting the surface of the earth has previously been difficult if not impossible to obtain. However, recent advances in the art have provided suitable apparatus and techniques for accomplishing this end and are fully described in copending application Serial No. 152,773 filed November 16, 1961.

In brief, that application describes apparatus for accomplishing the desired type of chemical placement comprising a conventional "rod weeder" which includes a horizontal rotatable square rod for soil disintegrating rotation in cooperation with a shear bar. The apparatus further includes an adjacent horizontal spray manifold for injecting chemicals at a plurality of closely spaced points into the soil disintegrated by the action of the rotating rod and shear bar. The advantages and reasons for such apparatus are set forth in said copending application and apply equally to the present case. In short, the device makes it possible to obtain unusually thorough and even distribution of the chemical without destroying the soil structure so that the surface is in a proper condition for planting.

The present invention employs the unique chemical disseminating concepts referred to above and combines them in cooperation with the further noted steps to achieve an integrated and coordinated system and apparatus that conditions and chemically treats the soil, leaves it in readiness for planting and growing, and preserves it in such a state by retaining the chemicals long enough to fully perform their allotted function. Thus the soil surface is manipulated in addition to chemical distribution so that it may be packed or shaped into conventional seed beds along with their adjacent furrows. The beds are of course preferably formed from or adjacent to the ground in which the treatment chemicals have been disseminated.

Injection and dissemination of soil treatment chemicals such as nematocides, fungicides, and the like are of only limited utility and are extremely costly for the benefits derived therefrom if the chemicals, which are quite generally extremely volatile in nature, are allowed to escape from the soil. Consequently, the present invention further contemplates the use of a sealant over the surface of the treated seed bed soil which substantially inhibits or prevents the volatilization or similar loss of the injected chemicals. The present invention thus treats, forms and preserves with respect to agricultural land in one continuous sequential operation.

With reference to the accompanying drawings, there is shown schematically in:

FIG. 1 in side elevation a tractor having apparatus depending therefrom for executing the present method.

FIG. 3 shows in side elevation a rear fragment of the tractor of FIG. 1 employing an alternate embodiment for sealing the seed beds.

FIG. 4 shows in end elevation the alternate embodiment for sealing the seed beds of FIG. 3.

Figure 1:
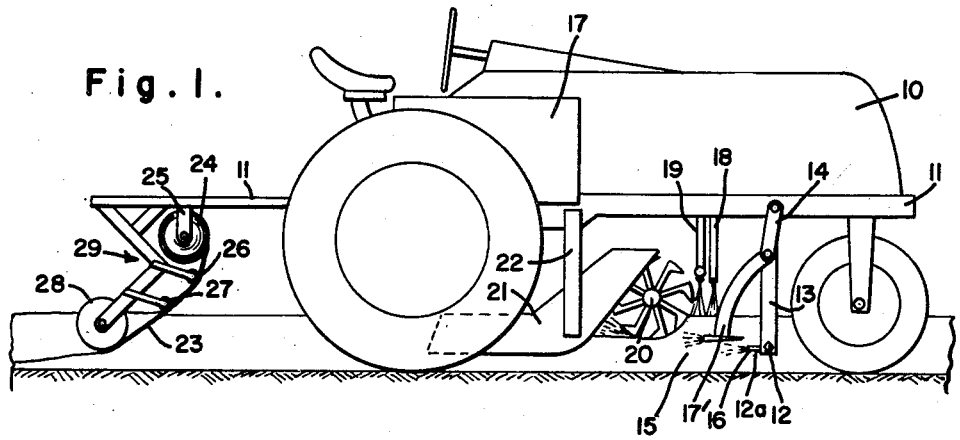

The principal object of the present invention is to provide an improved method and system for applying agricultural chemicals to soil.

A more specific object is to provide an improved method and system for applying soil treating or agricultural chemicals to soil horizontally so that an exceptionally thorough and uniform distribution is obtained and the surface of the soil is not unfavorably affected.

Another object is to provide a method and system for chemically treating soil equally satisfactorily whether or not the soil is in a trashy condition and contains weeds, stems, roots and the like.

A further object is to provide a soil treating method and system which cooperatively forms and shapes seed beds on the surface of the soil over which or through which the agricultural chemicals have been disseminated.

A further object is to provide a soil treating method and system which preserves the treated soil and prevents escape and loss of the treatment chemicals prior to the time that they have fully performed their function.

A feature and advantage of one embodiment relating to the spraying of a liquid plastic seal over the seed bed for achieving the last named object is in the decrease in cost of such a technique as opposed to the costs of the alternate embodiments employing pre-formed plastic or paper tarps. This plastic spray embodiment is more adaptable to farming operation because there is no need to remove the solid tarping materials when they are no longer needed. Another advantage is that the plastic spray may be so selected that the plastic acts as a soil conditioner if it is further mixed with the soil. Appropriate liquid plastic coatings, after being applied on the soil, also have the advantage of acting as an anti-crusting agent, stabilizing the soil particles so that they will not melt when wet.

Use of the present method makes it possible to expand the use of prior known crop protection chemicals by eliminating present seasonal limitations.

These and other objects and advantages have now been accomplished by the method of the present invention which comprises disseminating a soil treating chemical along a preselected stratum of soil. The surface of the soil generally coextensive with said preselected stratum is disintegrated and a seed bed shaped therefrom. The shaped bed surface is then sealed to substantially inhibit escape of the treatment chemical from the preselected stratum.

The present invention further provides a coordinated system which may be used in executing the foregoing method and broadly comprises first means for disintegrating soil in a preselected sub-surface stratum along with the matter contained therein and for disseminating a soil treating chemical in the disintegrated soil following the disintegration thereof without significantly disrupting the structure of the soil surface. The system further comprises second means for shaping a seed bed on the surface of the soil over the stratum treated by the first means. Third means are provided for sealing the seed beds formed by the second means to prevent escape of soil treating chemicals. The system includes fourth means for supporting said first three means and for bringing them in numerical order in relatively rapid succession over a common area of soil.

Figure 2:
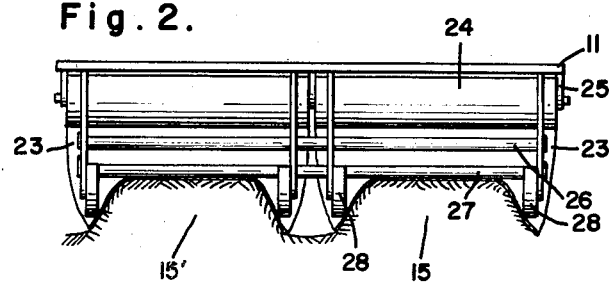
FIG. 2 shows in end elevation the rear portion of the tractor of FIG. 1 including the apparatus for laying a sealing tarp on the seed beds.

Turning to the drawings, FIGS. 1 and 2 in particular there is illustrated a tractor 10 including a horizontal frame 11 extending the length of tractor 10 and rearwardly therefrom for supporting the various portions of the present invention. At the forward end of tractor 10 and frame 11 a square rotatable rod 12 is depended by suitable braces 13, 14. Rotatable rod 12 is powered by suitable linkages (not shown) from power supplied by tractor 10.

Adjacent to and closely spaced rearwardly from rotatable bar or rod 12 is shear bar 12a. In operation, rod 12 is rotated in a horizontal position and when placed within a bed of soil such as beds 15, 15' and propelled longitudinally therethrough by movement of tractor 10, the cooperating action of rod 12 and bar 12a disintegrates a stratum of soil along with the materials contained therein such as roots and weeds, etc.

Discharge manifold 16 is positioned immediately behind shear bar 12a. Its function is to disseminate uniformly a selected soil treating chemical into the disintegrated earth just previously formed by rod 12 and bar 12a. Suitable chemicals are suppleid under pressure to manifold 16 from tank 17 on tractor 10 through suitable conduits (not shown). The operation of these parts and related structure is more fully described in the previously cited copending application.

As is also described in said copending application, it is suitable to include further chemical distributing means such as horizontal blade and spray pipe 17' for simultaneously distributing the same or other chemicals. Along the same line, it is sometimes advantageous to distribute other materails in liquid or powdered form on the surfaces of beds 15, 15' through suitable distribution nozzles or ports 18, 19.

Depending from frame 11 to the rear of rotatable rod 12 and shear bar 12a are rotatable blade wheel 20 and bed shaper 21. Rotatable blade wheel 20 is suitably supported and powered from tractor 10. Bed shaper 21 is suitably depended from frame 11 by brace 22. In operation, rotating blade wheel 20 disintegrates the surfaces of beds 15, 15'. Bed shaper 21 is then brought into contact with the disintegrated earth by moving it thereover as illustrated most clearly in FIG. 1 whereupon shaper 21 serves to pack and shape the soil to form a configuration having a conventional seed bed cross section as most easily seen in FIG. 2.

To prevent volatilizitaon or other type of loss of the disseminated chemicals injected from manifold 16, a covering such as a plastic or paper tarp 23 is applied over the treated and shaped beds 15, 15'. Tarp 23 is fed from roll 24 which is depended from frame 11 by bracket 25. Tarp 23 is guided into place by guide rollers 26, 27. Tarp 23 is packed in sealing position around beds 15, 15' by packing wheels 28. Guide rollers 26, 27 and packing wheels 28 are supported from frame 11 by suitable braces shown generally at 29.

In use, the foregoing apparatus permits uniform distribution of the chemical without fouling or disturbing the soil surface. The chemical is retained for the requisite time by a closure in the form of tarp 23. It will be obvious that tarp 23 may become a costly item when used in large quantities. Further, it must be removed before planting or other normal manipulations of the soil can be carried out.

In the alternate embodiment illustrated in FIGS. 3 and 4, the foregoing disadvantages of the tarp 23 have been eliminated. In this embodiment a plastic or similar coating which functions in the same way as tarp 23 is sprayed on seed beds 15, 15'. The types of plastic to be employed and the precise details for applying the same are discussed in detail in an application filed concurrently herewith in the names of David B. Scott and Robert P. Watwood entitled Soil Sealing Method, Serial Number 164,555, filed January 5, 1962.

In essence, in the preferred embodiment the plastic or resin is sprayed from a plurality of nozzles 30, 31 oriented to cover the surface of beds 15, 15'. Preferably the plastic employed is water soluble in at least one chemical state. The preferred material is then applied in two parts with a suitable water soluble aqueous polymer solution such as a carboxyvinyl polymer like Carbopol 934 stored in tank 32 and fed to nozzles 30 through pipe 33. Another tank 34 is mounted on frame 11 rearwardly of tank 32 and contains a suitable neutralizing or gelating solution for the water soluble form of the polymer (i.e. an aqueous base such as ammonia neutralizes Carbopol 934) for causing the gelation of the contents of tank 32 when contacted therewith.

The neutralizing solution in tank 34 is discharged therefrom by way of pipe 35 and through nozzles 31. It is advantageous to direct the emissions from nozzles 30, 31 so that they intersect above beds 15, 15'.

It will be obvious that liquids other than water may be used as the solvent although water is preferred for economic reasons, and that resins may be selected which can be applied from a single spray without being neutralized or otherwise treated. Further, the contents of tanks 32 and 34 are mutually dependent and will vary according to the materials selected and the result desired. By suitably selecting soil conditioning resins, the coating may be subsequently mixed with the soil instead of being removed as with tarp 23.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A method for chemically treating and forming seed beds adapted to retain the treatment chemicals therein which comprises:
    (a) disintegrating a preselected sub-surface stratum of soil along with the matter contained therein while disseminating a soil treating chemical in the disintegrated soil of the sub-surface stratum following the disintegration thereof without significantly disrupting the structure of the soil surface;
    (b) disintegrating the surface soil lying generally above said sub-surface stratum;
    (c) shaping a seed bed from the disintegrated surface soil;
    (d) and sealing the shaped bed surface to substantially inhibit escape of the treatment chemical from said sub-surface stratum to the ambient atmosphere.

2. A method for chemically treating and forming seed beds adapted to retain the treatment chemicals therein which comprises:
    (a) sequentially disintegrating soil along with the matter contained therein along a predetermined sub-surface stratum and substantially immediately thereafter uniformly disseminating a soil treating chemical in the disintegrated soil while the next adjacent area of the stratum is being disintegrated without significantly distrupting the structure of the surface;
    (b) disintegrating the surface soil lying generally above said sub-surface stratum;
    (c) shaping a seed bed from the disintegrated surface soil;
    (d) and sealing the shaped bed surface to substantially inhibit escape of the treatment chemical from said sub-surface stratum through the bed to the ambient atmosphere.

3. A method for chemically treating and forming seed beds adapted to retain the treatment chemicals therein which comprises:
    (a) sequentially disintegrating soil along with the matter contained therein along a predetermined sub-surface stratum and substantially immediately thereafter uniformly disseminating a soil treating chemical in the disintegrated soil while the next adjacent area of the stratum is being disintegrated without significantly disrupting the structure of the surface;

(b) disintegrating the surface of the soil generally above said predetermined sub-surface stratum by subjecting the surface soil to a rotating and cutting action;

(c) shaping a bed from the disintegrated surface soil by compressing the soil to a preselected contour;

(d) and substantially sealing the shaped bed surface to inhibit escape of the treatment chemical from said sub-surface stratum to the ambient atmosphere.

4. A method in accordance with claim 3 wherein the shaped bed surface is sealed by applying a layer of substantially fluid impervious plastic over the bed.

5. A method in accordance with claim 3 wherein the shaped beds are sealed by applying a paper tarp to the surface of the bed.

6. A method in accordance with claim 5 wherein the plastic is applied to the bed surface in liquid form by spraying thereon.

7. A method for chemically treating and forming seed beds adapted to retain the treatment chemicals therein which comprises:

(a) disintegrating a predetermined sub-surface stratum of soil along with the matter contained therein by subjecting the soil to rotary movement and shearing action and disseminating a soil treating chemical in the disseminated soil following the disintegration thereof by forcing the chemical under pressure into the soil at a closely shaped plurality of points without significantly disrupting the surface of the soil;

(b) disintegrating the surface of the soil lying generally above said predetermined sub-surface stratum by subjecting the soil to rotary and slicing movement;

(c) shaping a seed bed from said disintegrated surface soil by packing it in mounds of preselected cross section;

(d) and substantially sealing the top of said shaped beds by spraying a plastic coating thereon.

8. A coordinated system for sequentially processing agricultural land to provide chemically treated seed beds which retain the treatment chemicals comprising, in combination:

(a) first means for disintegrating soil in a predetermined sub-surface stratum along with the matter contained therein and for disseminating a soil treating chemical in the disintegrated soil following the disintegration thereof without significantly disrupting the structure of the soil surface;

(b) second means for shaping a seed bed on the surface of the soil over the stratum treated by said first means;

(c) third means for sealing the seed bed formed by said second means to prevent escape of soil treating chemicals;

(d) and fourth means for supporting said first three means and adapted for bringing them in numerical order in relatively rapid succession over a common area of soil.

9. A system in accordance with claim 8 wherein said first means includes:

(a) a horizontal rotatable shaft and cooperating shear bar;

(b) and a horizontal manifold adjacent to and behind the shear bar for discharging the soil treating chemical into the disintegrated soil.

10. A system in accordance with claim 8 wherein said third means includes liquid discharge ports positioned to spray a plastic in liquid form upon the surface of said seed beds after having been shaped by said second means.

References Cited in the file of this patent

UNITED STATES PATENTS

| | | |
|---|---|---|
| 1,882,377 | Whittelsey | Oct. 11, 1932 |
| 2,748,535 | Skromme | June 5, 1956 |
| 2,890,665 | Kang | June 16, 1959 |
| 2,916,855 | Thiegs | Dec. 15, 1959 |
| 2,961,799 | Coe | Nov. 29, 1960 |
| 3,020,859 | Kang | Feb. 13, 1962 |